May 31, 1960     E. T. LUFF     2,938,711
SAFETY LIVESTOCK GUARD
Filed April 2, 1958     2 Sheets-Sheet 1
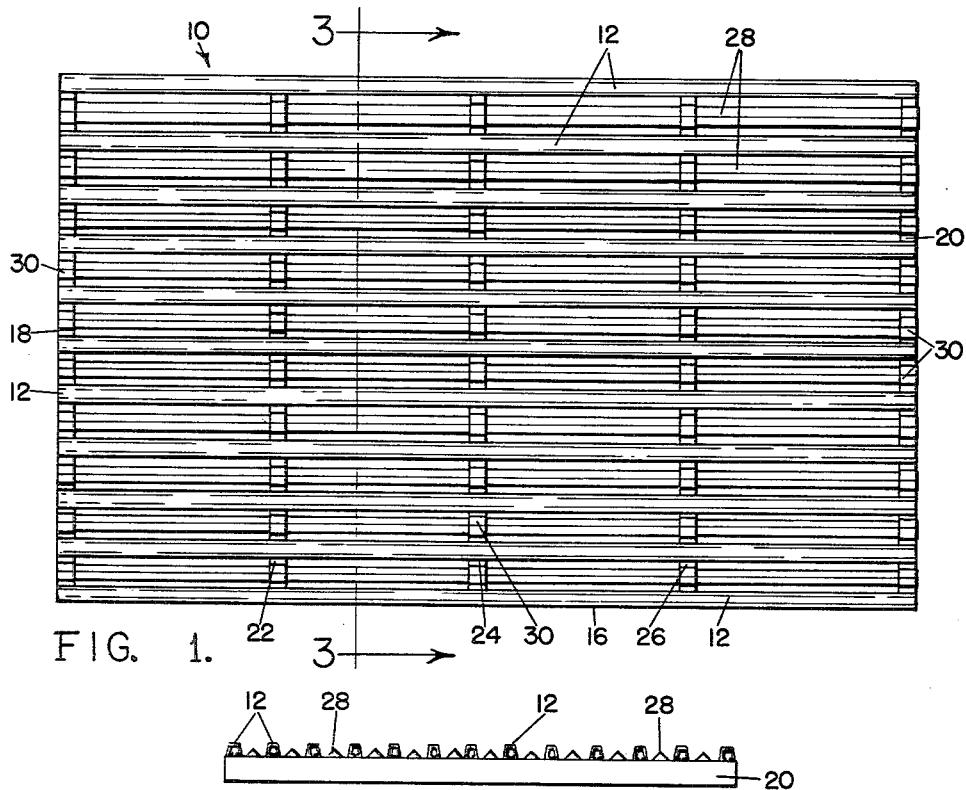
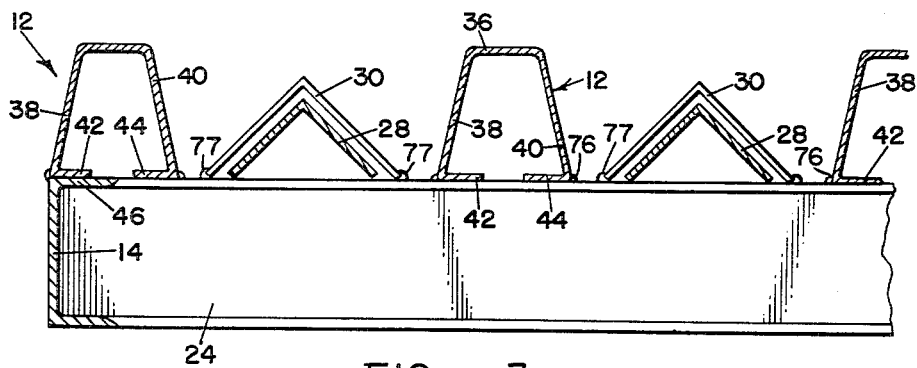
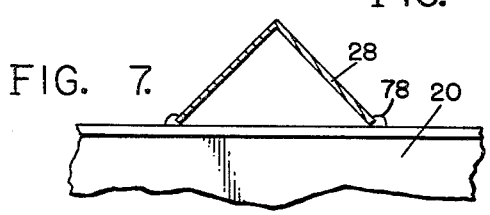
*INVENTOR,*
EARL T. LUFF.
BY May 31, 1960     E. T. LUFF     2,938,711
SAFETY LIVESTOCK GUARD
Filed April 2, 1958     2 Sheets-Sheet 2
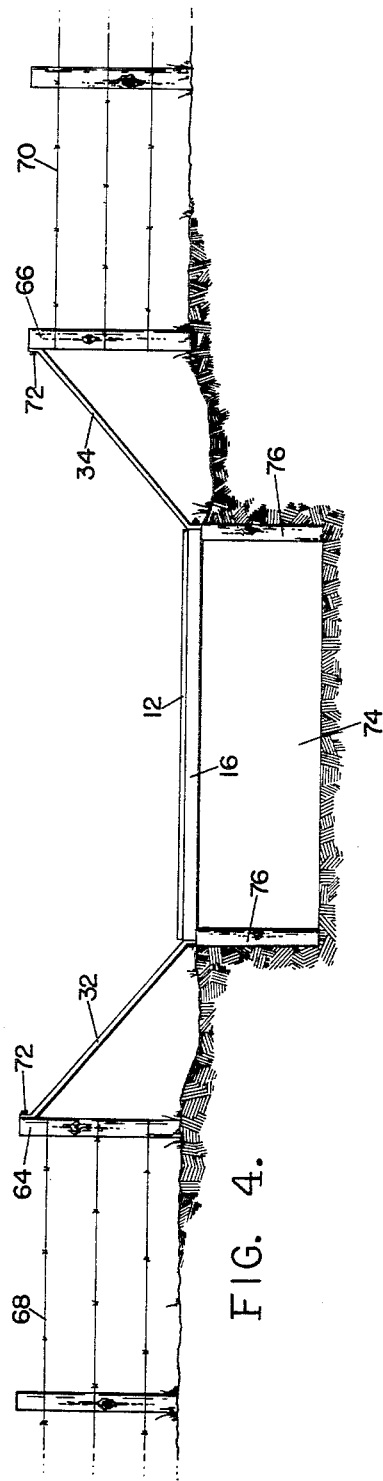
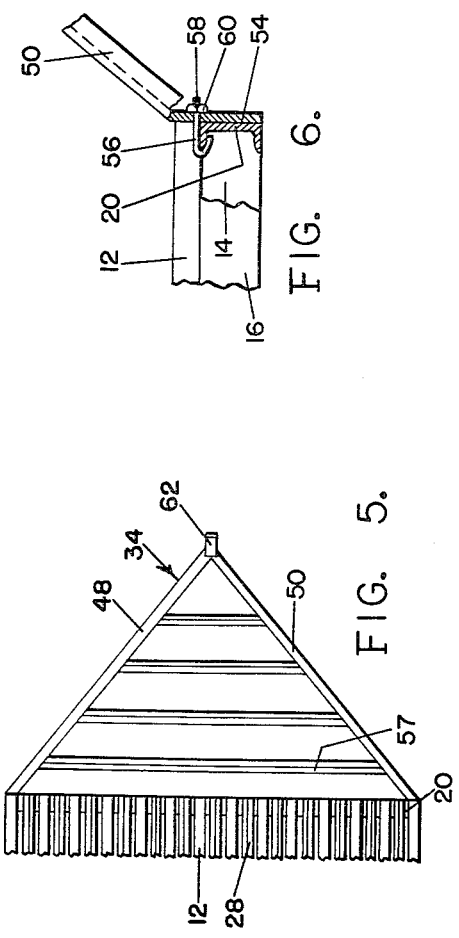
INVENTOR,
EARL T. LUFF.
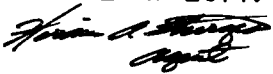

United States Patent Office 2,938,711
Patented May 31, 1960

2,938,711

SAFETY LIVESTOCK GUARD

Earl T. Luff, 315 W. O St., Lincoln, Nebr.

Filed Apr. 2, 1958, Ser. No. 725,870

1 Claim. (Cl. 256—17)

This invention relates to cattle guards or gates for gaps in fences whereby trucks may pass through the gaps and whereas livestock, such as cattle, horses, hogs, sheep and the like are prevented from passing through, and in particular an improved cattle gate including spaced longitudinally disposed rails rigidly mounted on a frame designed to be positioned with upper surfaces of the rails flush with the ground and inverted angle bars between the rails and positioned with the vertexes thereof extended upwardly, the angle bars being loosely mounted on the frame so that they will rattle when subjected to abuse, such as by hoofs of cattle.

The purpose of this invention is to provide an improved cattle guard or gate that is of rugged construction and that produces a rattle as livestock attempt to cross it.

In recent years the use of cattle guards has increased considerably, however, substantially all conventional guards present one problem, and that is trapping the animals. Numerous attempts have been made to avoid trapping the livestock, although in some instances it is necessary to destroy stock because they are trapped in the guards.

With this thought in mind this invention contemplates an improved cattle guard in which it is substantially impossible for an animal to be trapped therein, and which provides a smooth upper surface for the reception of truck and other vehicle tires or treads.

The object of this invention is, therefore, to provide an improved cattle guard in which the possibility of animals being trapped therein is substantially eliminated.

Another object of the invention is to provide an improved cattle guard over which trucks may pass freely without damage to the tires thereof.

Another important object of the invention is to provide an improved cattle gate or guard that turns back livestock without causing discomfort or injury to the livestock.

It is yet another object of the invention to provide an improved cattle guard over which a truck may pass without the surfaces of the tires thereof contacting sharp or studded edges of the rails or bars of the guard at any time.

A further object of the invention is to provide a cattle guard in which the uncomfortableness of the sharp or studded edges or apexes of parts thereof and the unstable footing and rattling of loose bars would discourage animals and cause them to withdraw instead of trying to cross the guard.

A still further object is to provide a cattle gate in which the same usual visual or optical obstacles are presented as are presented by conventional's pit gate guards.

And a still further object is to provide a cattle guard having a rattle therein which does not injure or trap livestock, or damage motor vehicle tires in which the guard is of a simple and economical construction.

With these and other objects and advantages in view the invention embodies a rigid frame preferably formed of channel bars and designed to be inserted in the ground in a gap or opening in a fence, spaced parallel trapezoidal-shaped rails secured to the frame and positioned in planes parallel to the fence, inverted angle bars positioned between the rails, and clip angles extended over the angle bars, spaced therefrom, and positioned at the ends of the frame and also at points intermediate thereof.

Other features and advantages of the invention will appear from the following description taken in connection with the drawings, wherein:

Figure 1 is a plan view of the improved cattle guard.

Figure 2 is an end elevational view looking toward one end of the cattle guard.

Figure 3 is a cross section through the guard, taken on line 3—3 of Figure 1, with the parts shown on an enlarged scale and with parts broken away.

Figure 4 is a side elevational view of a fence showing the improved cattle guard in a pit in a gap or opening in the fence and showing wings extended from ends of the guard to upper ends of posts at the ends of the fence.

Figure 5 is a plan view showing one of the wings attached to an end of the cattle guard.

Figure 6 is a section through one end of the cattle guard illustrating the method of connecting the wings to the guard and showing the device with parts broken away.

Figure 7 is a cross section through one of the inverted angle bars of the guard, with the parts shown on an enlarged scale and showing a modified construction wherein the angle bars are welded to the frame members.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating spaced longitudinally disposed rails mounted on a frame formed with side channel bars 14 and 16, end channel bars 18 and 20, and intermediate channel bars 22, 24 and 26, numeral 28 angle bars on the frame and positioned between the rails, numeral 30 clip angles mounted on the end and intermediate channel bars and freely positioned over the angle bars, and numerals 32 and 34 wings removably connected to ends of the frame and extended for connection to upper ends of posts spaced from the ends of the frame.

The rails 12 are trapezoidal-shaped in cross section having plateau-like upper surfaces 36, inclined side plates 38 and 40, and flanges 42 and 44 on lower edges of the side plates. The rails are rigidly secured to upper flanges 46 of the channel bar members of the frame, such as by welding, as shown at the points 76, although the rails may be mounted on the frame by other means, and, as shown in Figure 3, the tips or edges of the clip angles 30 are also secured to the channel bars by welding, or the like. The clip angles are larger than the angle bars so that spaces are provided between the angle bars and clip angles whereby the angle bars will rattle when subjected to abuse, such as by hoofs of livestock.

The clip angles are positioned over the angle bars being secured to the channel bars at the ends of the frame and also to the channel bars intermediate of the ends of the frame by welding as shown at the points 77, or by other means.

As shown in Fig. 7 the clip angles may be omitted and the angle bars 28 may be welded directly to the end channel bars 18 and 20 and also to the intermediate channel bars 22, 24 and 26, as indicated by the numeral 78.

The wings are provided with converging side bars 48 and 50 which are connected by transversely disposed bars 52, and downwardly disposed ends 54 of the side bars are secured to the channel bars of the frame by hook-bolts 56, threaded ends 58 of which are provided with nuts 60, as shown in Figure 6. The upper ends of the wings are provided with clip angles 62 by which the wings are attached to posts 64 and 66 of fence sections 68 and 70, by bolts 72, as shown in Figure 4.

Also, as shown in Figure 4, the channel bar frame is installed over a pit 74 in a gap in the fence, with the frame supported by timbers or posts 76. The posts may also be of concrete, and the pit may be provided with a concrete wall or liner upon which the frame may be positioned.

Where space is limited the wings may be omitted.

With the parts assembled and installed, as shown in Figure 4, it will be necessary for livestock to walk over the rails and angle bars in order to pass through the gap and where attempts are made to cross the guard the rattle of the loose angle bars discourages the livestock and they turn back. With the spaces between the rails closed by the angle bars trapping of animals on the guard is substantially obviated, and the possibility of breaking a leg is eliminated.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description in regarded as unnecessary.

Changes in shape, size and arrangement of details and parts such as come within the purview of the invention claimed may be resorted to in actual practice, if desired.

Having now described the invention that which is claimed to be new and desired to be procured by Letters Patent, is:

In a cattle guard, the combination which comprises a rectangular-shaped frame including side, end, and intermediate channel bars, the intermediate channel bars being parallel to the end channel bars, spaced longitudinally disposed beams trapezoidal in cross section secured such as by welding to upper surfaces of the channel bars, longitudinally disposed angle bars resting on the channel bars and positioned between the trapezoidal bars, the angle bars being positioned whereby the vertexes thereof extend upwardly, the vertexes of the angle bars being positioned in a plane spaced downwardly from upper surfaces of the trapezoidal bars, and clip angles mounted by welding on the channel bars, also with vertexes thereof extended upwardly, positioned over ends of the angle bars and spaced from said angle bars whereby the angle bars are retained in approximate positions, being free to slide on the channel bars, and, consequently, being mounted to produce sound when engaged by tires of motor vehicles or hoofs of livestock.

References Cited in the file of this patent

UNITED STATES PATENTS

| | | |
|---|---|---|
| 450,450 | Davidson | Apr. 14, 1891 |
| 455,717 | Howard et al. | July 7, 1891 |
| 694,972 | Klick | Mar. 11, 1902 |
| 2,591,220 | Welter | Apr. 1, 1952 |